United States Patent [19]

Lefevre

[11] Patent Number: 5,898,332

[45] Date of Patent: Apr. 27, 1999

[54] TIME DELAY CHARGE INTEGRATION CIRCUIT

[75] Inventor: Andrew Paul Lefevre, Dunmow, United Kingdom

[73] Assignee: Northern Telecom Limited, Montreal, Canada

[21] Appl. No.: 08/827,243

[22] Filed: Mar. 28, 1997

[51] Int. Cl.$^6$ ............................................. G06G 7/64
[52] U.S. Cl. ........................... 327/336; 327/337; 377/58
[58] Field of Search ................................. 327/336, 337, 327/536; 363/59, 60; 307/110; 377/58, 60

[56] References Cited

U.S. PATENT DOCUMENTS 4,988,900  1/1991  Fensch ................................ 327/337
5,095,223  3/1992  Thomas ................................ 363/60
5,491,623  2/1996  Jansen ................................ 327/536

Primary Examiner—Kenneth B. Wells
Attorney, Agent, or Firm—John D. Crane

[57] ABSTRACT

A charge integration circuit incorporates first and second capacitors, and first and second reference voltage supplies. A first switch controls integration of charge in the first capacitor and selectively resets the first capacitor to the first reference voltage. A second switch selectively resets the second capacitor to the first reference voltage. A current mirror coupled to the capacitors effects discharge of the second capacitor by a quantity of charge equivalent to the charge integrated on the first capacitor so as to effectively transfer charge therebetween at the end of an integration period.

7 Claims, 6 Drawing Sheets

TIME DELAY CHARGE INTEGRATION CIRCUIT

This invention relates to infra-red imaging systems, and in particular to time delay integration (TDI) systems for the detection and processing of infra-red signals.

BACKGROUND OF THE INVENTION

Infra-red image detectors, e.g. for use in night vision equipment, have been constructed using a number of technologies and circuit techniques. Such detectors comprise an array of infra-red sensitive elements coupled to image processing circuitry, the assembly being fabricated on a common silicon substrate. The detectors employ a cyclic integration technique in which the photo current from each photo diode element is stored in a respective integrating capacitor during each integration cycle. At the end of the cycle, the capacitor is discharged or reset ready for the next cycle. The technologies employed in constructing these detectors include the use of charge coupled devices (CCD) which use a linear array of potential wells in a silicon substrate to store image induced charge. Further CMOS and bipolar technologies employ integrated circuit capacitors for charge storage.

The technique of time delay integration (TDI) has been introduced by a number of workers and has the advantage that it provides a reduction in detector noise by a factor of $\sqrt{n}$ where n is the number of stages in the TDI chain. This is of importance in the detection and processing of infra red signals.

A particular problem with infra-red imaging circuitry is that of power dissipation. In order to reduce background noise, the detector is cooled, typically to the temperature of liquid nitrogen. It will be appreciated that the heating of the circuitry resulting from any excessive power dissipation will impair or negate the effects of cooling. Many workers have employed CMOS technologies for the implementation of TDI read-out arrays. However, the unity gain amplifiers needed to transfer the stored integration charge from one TDI stage to the next suffers from two problems. Firstly, each amplifier consumes power which, for a large array, results in excessive power dissipation. Secondly, CMOS amplifiers are inherently noisy at low frequencies and this reduces the effectiveness of the TDI technique. For this reason, various workers have investigated bipolar techniques.

The most commonly used bipolar detectors employ an analogue shift register technique which is generally referred to as a bucket brigade delay line. Such a technique is described by F L J Sangster et al. in IEEE Journal of Solid State Physics, Vol. SC-4, No. 3, June 1969, pp 131–136, and by G Krause in Electronics Letters, December 1967, Vol. 3, No. 12, pp 544–546. Circuits of this type comprise a master and slave arrangement for each stage and use a two-phase clock for transferring charge between the master and slave circuits at each stage. While the use of bipolar circuitry significantly reduces the problem of electrical noise, the conventional bucket brigade arrangement suffers from two key limitations. Firstly, the dynamic range of the circuit is limited to about one half of the supply voltage which, for current bipolar processes, is about 2.5 volts. This is because the clocking process causes both terminals of each charge storage capacitor to rise in voltage by an amount equal to the sum of the maximum stored voltage and the bipolar transistor threshold voltage $V_{be}$. Further, the maximum voltage to which the circuit can be subjected is limited by the reverse breakdown voltage of the bipolar emitter/base junctions. Secondly, the resetting of the charge storage capacitors requires additional circuitry and cycle time for each stage.

SUMMARY OF THE INVENTION

An object of the invention is to minimise or to overcome the above disadvantages.

A further object of the invention is to provide an improved bipolar time delay integration infra-red imaging system.

According to one aspect of the invention there is provided a charge integration circuit, including first and second capacitors, a reference voltage supply, first switch means for controlling integration of charge in said first capacitor and for selectively resetting said first capacitor to the reference voltage, second switch means for selectively resetting said second capacitor to the reference voltage, and current mirror means coupled to said first and second capacitors and arranged, on said reset of said first capacitor, to effect discharge of the second capacitor by a quantity of charge equivalent to the charge integrated on the first capacitor so as to effectively transfer charge therebetween.

According to another aspect of the invention there is provided a charge integration circuit, including first and second capacitors, first and second reference voltage supplies, first switch means for controlling integration of charge in said first capacitor and for selectively resetting said first capacitor to the first reference voltage, second switch means for selectively resetting said second capacitor to the first reference voltage, current mirror means coupled to said first and second capacitors and arranged, on said reset of said first capacitor, to effect discharge of the second capacitor by a quantity of charge equivalent to the charge integrated on the first capacitor so as to effectively transfer charge therebetween, third switch means for providing a virtual ground to said first capacitor during said reset of said first capacitor so as to provide a discharge path for said first capacitor.

According to a further aspect of the invention there is provided a time delay integration circuit comprising a plurality of charge integration stages each incorporating a capacitor on which the charge is integrated during an integration period, a reference voltage supply, switch means for controlling integration of charge in each said capacitor and for selectively resetting each said first capacitor to the reference voltage at the end of said integration period, and charge transfer means for transferring charge from said capacitor of each said integration stage to said capacitor of the next integration stage at the end of said integration period whereby to provide a measure of the total charge integrated during said integration period.

Preferably the switch means comprise respective field effect transistors. The current mirror may comprise first and second bipolar transistors having a common emitter connection and a common base connection.

BRIEF DESCRIPTION OF THE DRAWINGS

An Embodiment of the invention will now be described with reference to the accompanying drawings in which.

DESCRIPTION OF PREFERRED EMBODIMENT

Figure 1:
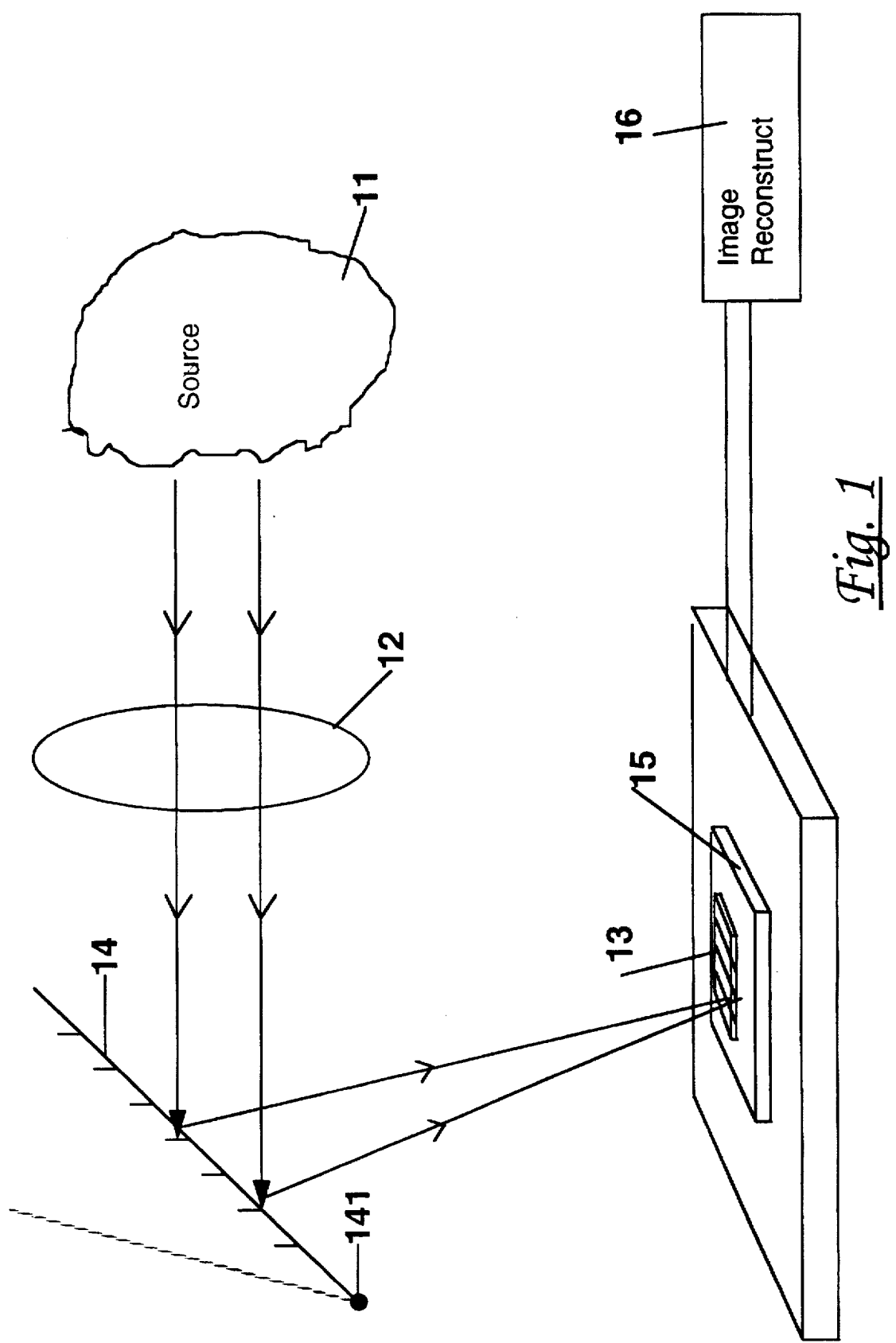
FIG. 1 is a schematic diagram of an infra-red imaging system incorporating a time delay integration circuit.

Referring to FIG. 1, this shows in schematic form an infra-red imaging system incorporating a time delay integration circuit. Infrared light from a source 11 is focused by a convex lens 12 on to the surface of a detector array 13 via a movable plane mirror 14. In use, the mirror is rotated back and forth about an axis 141 so as to scan the infra-red image signal across the surface of the detector array on a cyclic basis.

The detector array 13 is mounted on a read-out ASIC 15, and this assembly is cooled e.g. to the temperature of liquid nitrogen. The output from the detector/ASIC assembly is coupled to a processor 16 which reconstructs the image.

The detector 13 comprises a rectangular array of rows and columns of photo diodes, the photo diodes of each row being coupled to corresponding inputs of a respective multistage time delay integration (TDI) circuit forming part of the ASIC. In use, each scan of the image across an individual photo diode of the array generates a corresponding photo current signal. The photo current signals for each photo diode are integrated over a time period to build up an enhanced image which can be displayed to a user via image reconstruction circuitry.

Figure 2:
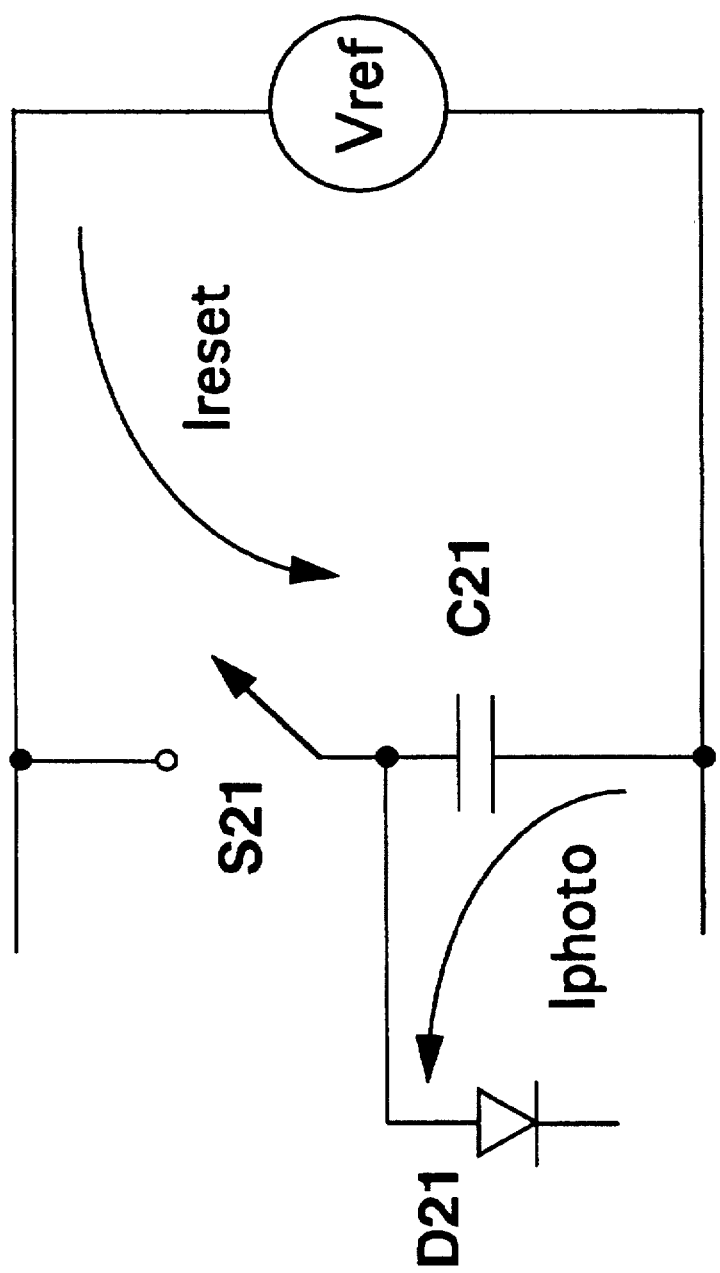
FIG. 2 shows a schematic circuit illustrating the principle of photo current integration.

Referring now to FIG. 2, which is introduced for comparative and explanatory purposes, this shows in partly schematic form a simple capacitor circuit stage of a TDI chain used for integrating the photon induced current, $I_{photo}$, from a detector diode D21. Charge representative of the diode photo current is stored during each integration cycle in an integration capacitor C21. At the end of the integration cycle, this charge is output to the next stage of the chain. The capacitor C21 is then reset via switch S21 ready for the next integration cycle. It will be appreciated that this switch will comprise an electronic device, e.g. a field effect transistor.

The operation cycle of the circuit of FIG. 2 is as follows:

1. At the start of each integration period, the integration capacitor, C21 is reset to a reference voltage $V_{ref}$ by switch S21. This is achieved by the transient current $I_{reset}$ flowing from $V_{ref}$ to 0 V or ground.
2. During the integration period switch S21 is open and capacitor C21 is discharged by an amount depending on the magnitude of the current $I_{photo}$ which flows from the capacitor via the 0 V or ground supply rail. The voltage on the integration capacitor C21 now represents the total photo-current integrated over a certain time period and is usually buffered by a unity gain voltage buffer (not shown) to a sample and hold capacitor for read-out while the next integration cycle takes places.

Note that the act of resetting capacitor C21, ready for the next integration period, effectively discards or dumps the charge that has accumulated during the previous integration period.

Figure 3:
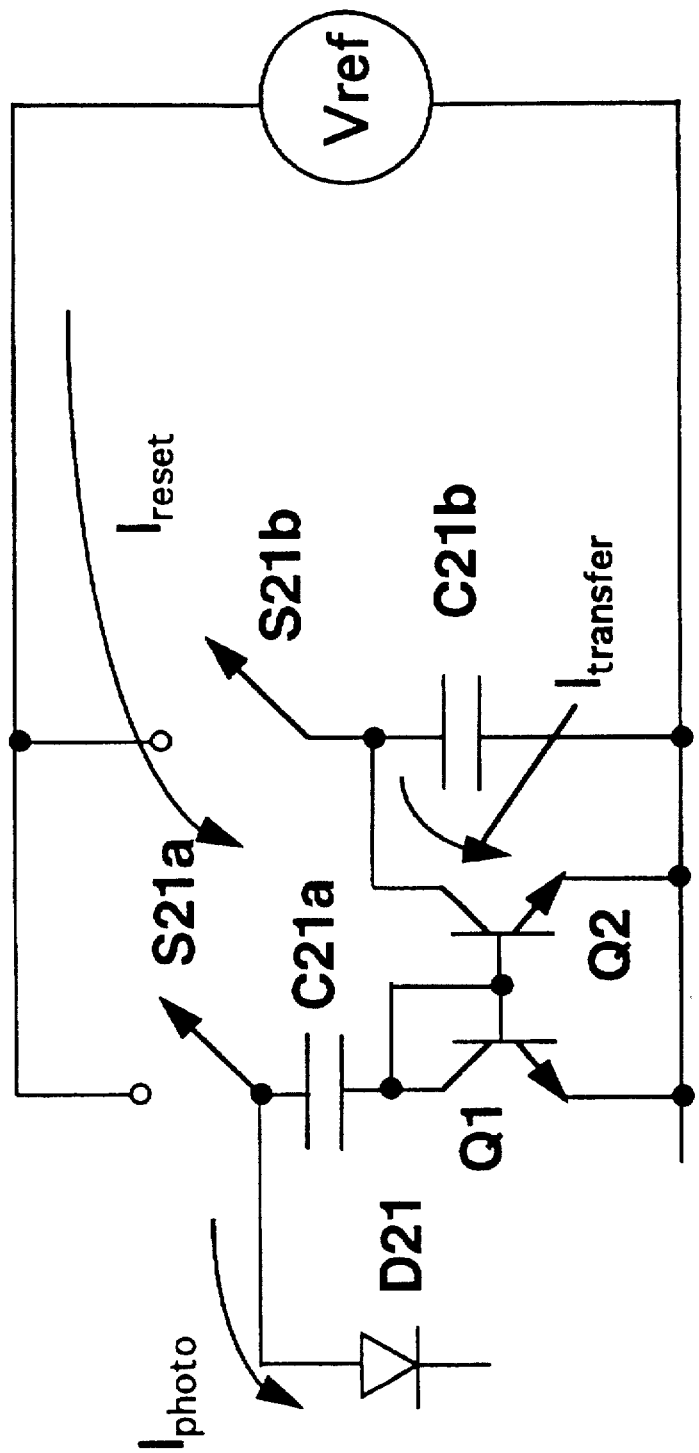
FIG. 3 shows a development of the circuit of FIG. 2.

FIG. 3 shows a modified integration stage designed to intercept $I_{reset}$, i.e. to make use of the charge that would otherwise be discarded during the reset period, by providing a current mirror comprising transistors Q1 and Q2 in series with the integration capacitor C21a which is reset via switch S21a. In this arrangement, the integration capacitor C21b of the next TDI stage is employed as a charge reservoir and is coupled in parallel with the current mirror. Switch S21b is used to reset the capacitor C21b by coupling that capacitor to $V_{ref}$ before switch S21a is closed to reset capacitor C21a. Operation of the circuit of FIG. 3 is as follows:

The capacitor C21b is reset to $V_{ref}$ by closure of switch S21b. Switch S21b is then opened and switch S21a is closed to reset the integration capacitor C21a. This causes a current $I_{reset}$ to flow in the current mirror reference device, Q1, and causes a corresponding mirrored current transfer ($\sim I_{reset}$) to flow in transistor Q2, out of capacitor C21b. Thus capacitor C21b discharges through the collector/emitter path of transistor Q2 by the same amount of charge that the integration capacitor C21a has been charged-up by, and transfer of charge equivalent to the integrated photo-current from the integration capacitor C21a to capacitor C21b is thus achieved using the action of resetting capacitor C21a. In the circuit of FIG. 3, during integration the current mirror reference device Q1 does not allow the current Iphoto to flow out of 0 V. This is overcome in the circuit shown in FIG. 4.

Figure 4:
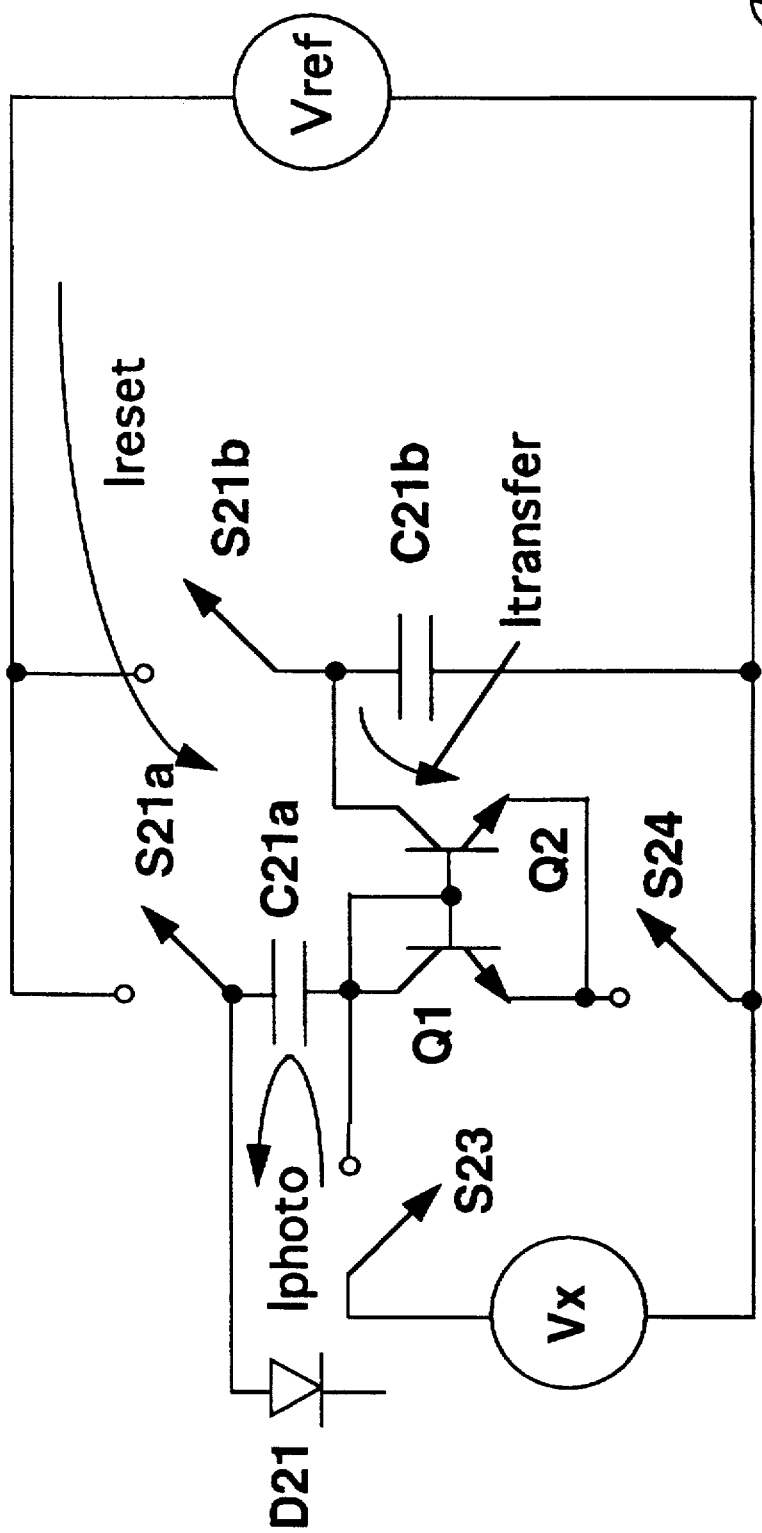
FIG. 4 shows a bipolar integration stage according to a preferred embodiment of the invention.

Referring to FIG. 4, this shows a bipolar integration stage according to a preferred embodiment of the invention. A further voltage reference source Vx is provided and is selectively coupled to the integration capacitor C21a via switch S23. The current mirror comprised by transistors Q1 and Q2 is selectively coupled to the circuit ground via switch S24. The circuit operation is as follows:

1. During integration, switches S21a, and S24 are open and switch S23 is closed. A current $I_{photo}$ flows through the photo diode D21 from a reference voltage source Vx and is integrated on capacitor C21a by discharging that capacitor by a corresponding amount of charge.

2. During reset of the integration capacitor C21a, switch S23 is opened and then switches S21a and S24 are closed so that capacitor C21b is discharged (S21b is open) by $I_{transfer}$.

The value of the voltage source Vx is set to approximately the voltage that is developed across the current mirror reference device, Q1, during the reset of capacitor C21a. Thus the connection to C21a, formed by transistor Q21 and switch S23, acts as a virtual ground allowing both source and sink of current with little change of voltage while allowing the sourced current, $I_{reset}$ to be mirrored with the current mirror circuit. Also, the parasitic capacitances associated with transistor Q1 are kept charged-up to a value near the operating voltage of Q1 during reset. This optimises the charge transfer efficiency from capacitor C21a to capacitor C21b.

Figure 5:
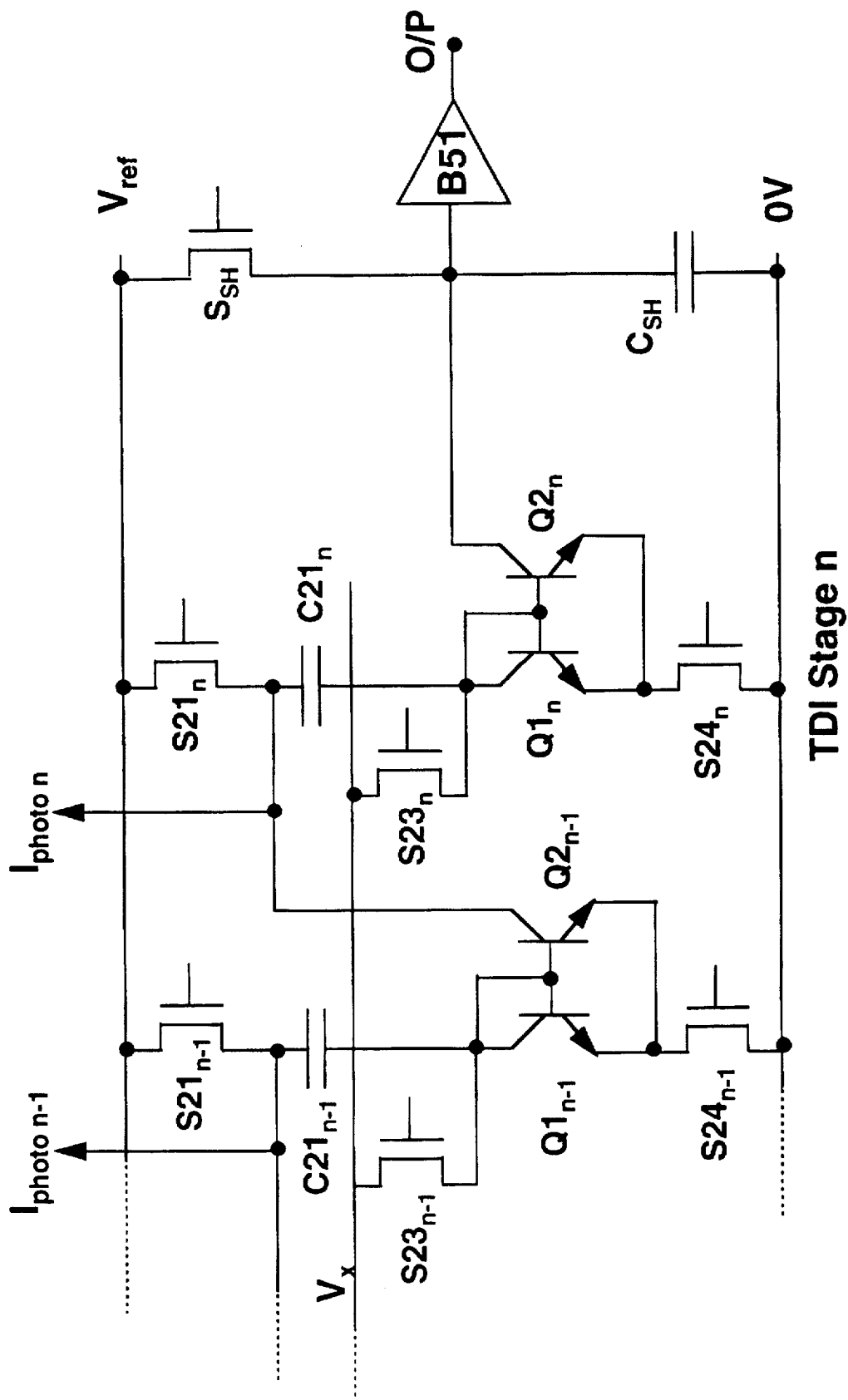
FIG. 5 illustrates the construction of a time delay integration circuit from a series of integration stages as shown in FIG. 4.
Figure 6:
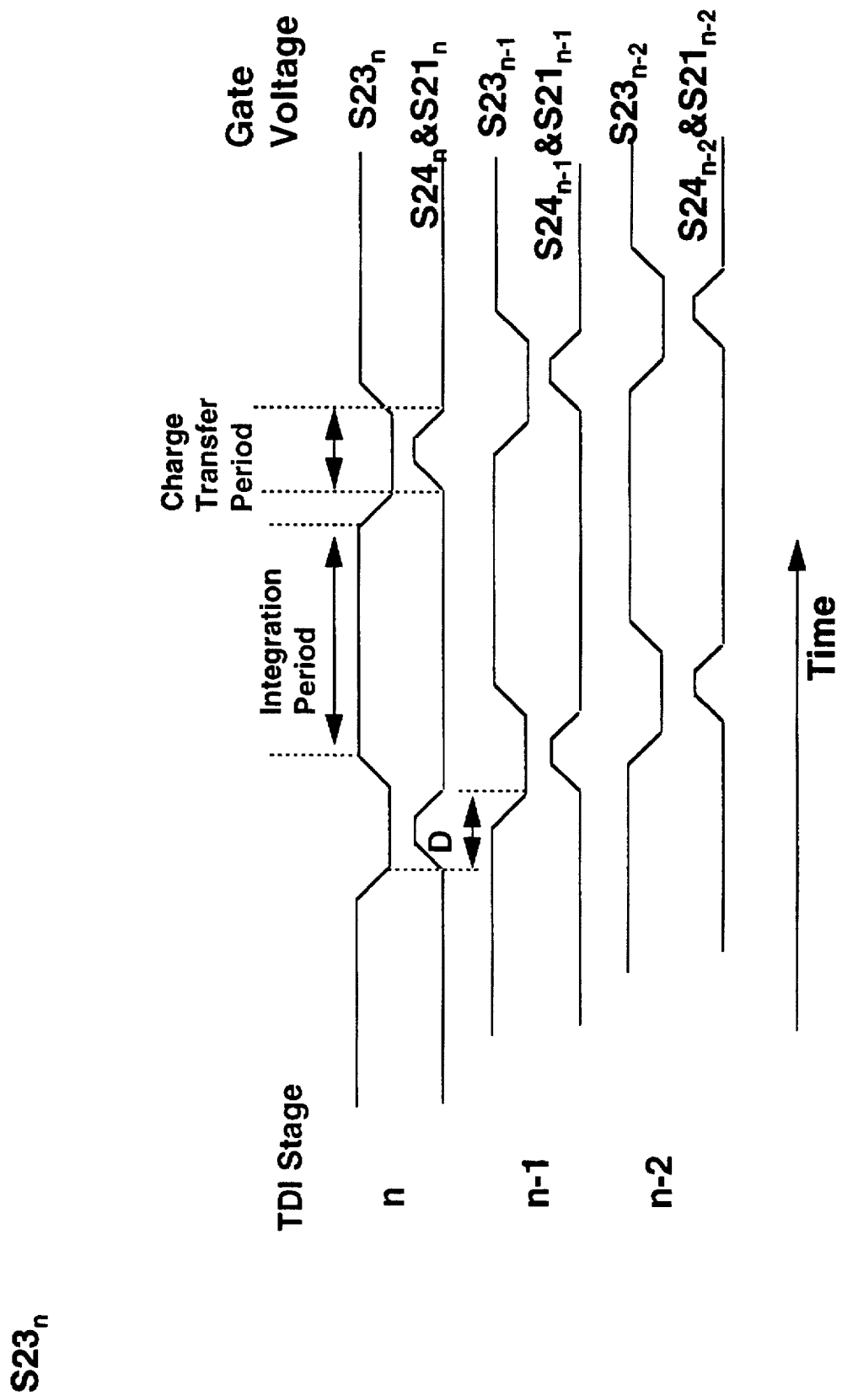
FIG. 6 is a timing diagram illustrating the operation of the circuit of FIG. 5.

FIG. 5 shows the construction of a time delay integration (TDI) chain comprising a plurality of the integration stages shown in FIG. 4. The arrangement is shown fabricated in a BiCMOS process wherein the switches are formed by field effect transistors and the current mirrors are formed from bipolar transistors. In this arrangement, the integration capacitor $C21_n$ of each stage also functions as the charge transfer capacitor of the previous stage. Each capacitor $C21_{n-1}$, $C21_n$ ... has a respective mirror circuit, composed of $Q1_n$, $Q2_n$; $Q1_{n-1}$, $Q2_{n-1}$, .... in series therewith. The capacitors $C21_{n-1}$, $C21_n$ ... are reset via respective field effect transistor switches $S21_n$, $S21_{n-1}$ ... to $V_{ref}$ and switches $S23_n$, $S23_{n-1}$ ... to $V_x$. The final stage of the time delay integration chain comprises a sample and hold capacitor $C_{SH}$ and a corresponding reset switch $S_{SH}$. Advantageously, the circuit output is provided via a buffer amplifier B51. Charge is transferred along the 'n' stage TDI chain in a stepwise operation the timing of which is shown in FIG. 6 which illustrates the voltage wave forms applied to the respective switches $S21_n$, $S21_{n-1}$ . . . and $S21_n$, $S21_{n-1}$ . . . . Each stage has alternate integration and charge transfer periods, the sequence of operations being as follows:

1. In the last or $n^{th}$ TDI stage, charge is transferred from the respective integration capacitor $C21_n$ to the sample and hold capacitor $C_{SH}$ for read-out via the output buffer B51 e.g., to a multiplexed bus output (not shown).

2. the $n-1^{th}$ TDI stage charge is then transferred to the $n^{th}$ stage, the $n-2^{th}$ stage charge is transferred to the $n-1^{th}$ TDI stage and so on until the 1st stage charge is transferred to the 2nd stage. The entire cycle then repeats.

Note that the bipolar current mirrors could equally be replaced with MOS current mirrors allowing a CMOS process implementation of the charge conveyor scheme.

I claim:

1. A charge integration circuit, including first and second capacitors, a reference voltage supply, first switch means for controlling integration of charge in said first capacitor and for selectively resetting said first capacitor to the reference voltage, second switch means for selectively resetting said second capacitor to the reference voltage, and current mirror means coupled to said first and second capacitors and arranged, on said reset of said first capacitor, to effect discharge of the second capacitor by a quantity of charge equivalent to the charge integrated on the first capacitor so as to effectively transfer charge therebetween.

2. A charge integration circuit, including first and second capacitors, first and second reference voltage supplies, first switch means for controlling integration of charges in said first capacitor, second switch means for selectively resetting said second capacitor to the second reference voltage, current mirror means coupled to said first and second capacitors and arranged to effect discharge of the second capacitor by a quantity of charge equivalent to the charge integrated on the first capacitor so as to effectively transfer charge therebetween, and third switch means selectively resetting said first capacitor to the first reference voltage and for providing a virtual ground to said first capacitor during said reset of said first capacitor so as to provide a discharge path via said current mirror means for said first capacitor.

3. A charge integration circuit as claimed in claim 2, wherein said current mirror means comprises first and second bipolar transistors having a common emitter connection and whose collectors are coupled to the first and second capacitors respectively.

4. A charge integration circuit as claimed in claim 3, wherein said third switch means is arranged to selectively ground the emitters of said first and second bipolar transistors.

5. A charge integration circuit as claimed in claim 4, wherein each of said first, second, third and fourth switch means comprises a respective field effect transistor.

6. A time delay integration circuit comprising a linear arrangement of concatenated charge integration stages each incorporating a capacitor on which a charge is integrated during an integration period, each said stage having an input for receiving a current to be integrated and an output to the next stage of the arrangement, whereby charge is transferred from the capacitor of that stage to the capacitor of the next stage of the arrangement during a charge transfer period following said integration period, first switch means for controlling integration of charge in each said capacitor during said integration period and for selectively resetting each said capacitor to a reference voltage during said charge transfer period, current mirrors one for each said stage and each arranged with a first current path in series with the capacitor of that stage and having a second current path coupled to the capacitor of the next stage of the arrangment so as to effect discharge of the capacitor of the next stage by a quantity of charge equivalent to the charge integrated on the capacitor of the said stage so as to effectively transfer the integrated charge along said arrangement, thereby to provide a measure of the total charge integrated during said integration period, and second switch means coupled to each said capacitor at its connection to the respective current mirror for providing a virtual ground to that capacitor during said reset of that capacitor so as to provide a discharge current path for that capacitor.

7. A method of charge integration in an integration circuit circuit comprising first and second capacitors and a reference voltage supply, the method including integrating charge in said first capacitor during a first time period, setting said second capacitor to the reference voltage during the first time period, resetting said first capacitor to the reference voltage during a second time period so as to generate a discharge current, and mirroring said discharge current in said second capacitor so as to effect discharge of the second capacitor by a quantity of charge equivalent to the charge integrated on the first capacitor to said second capacitor.

* * * * *